United States Patent Office 3,428,172
Patented Feb. 18, 1969

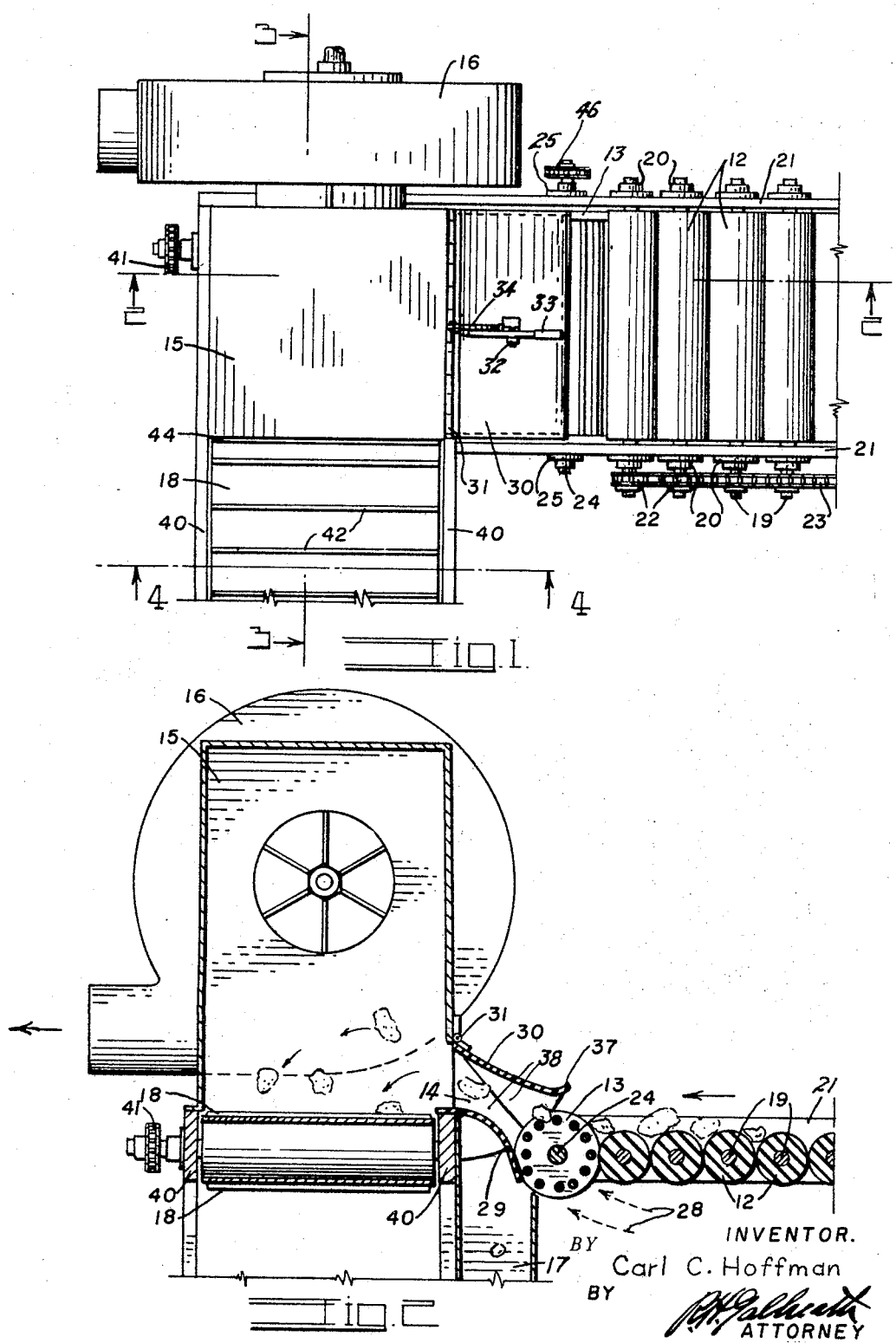

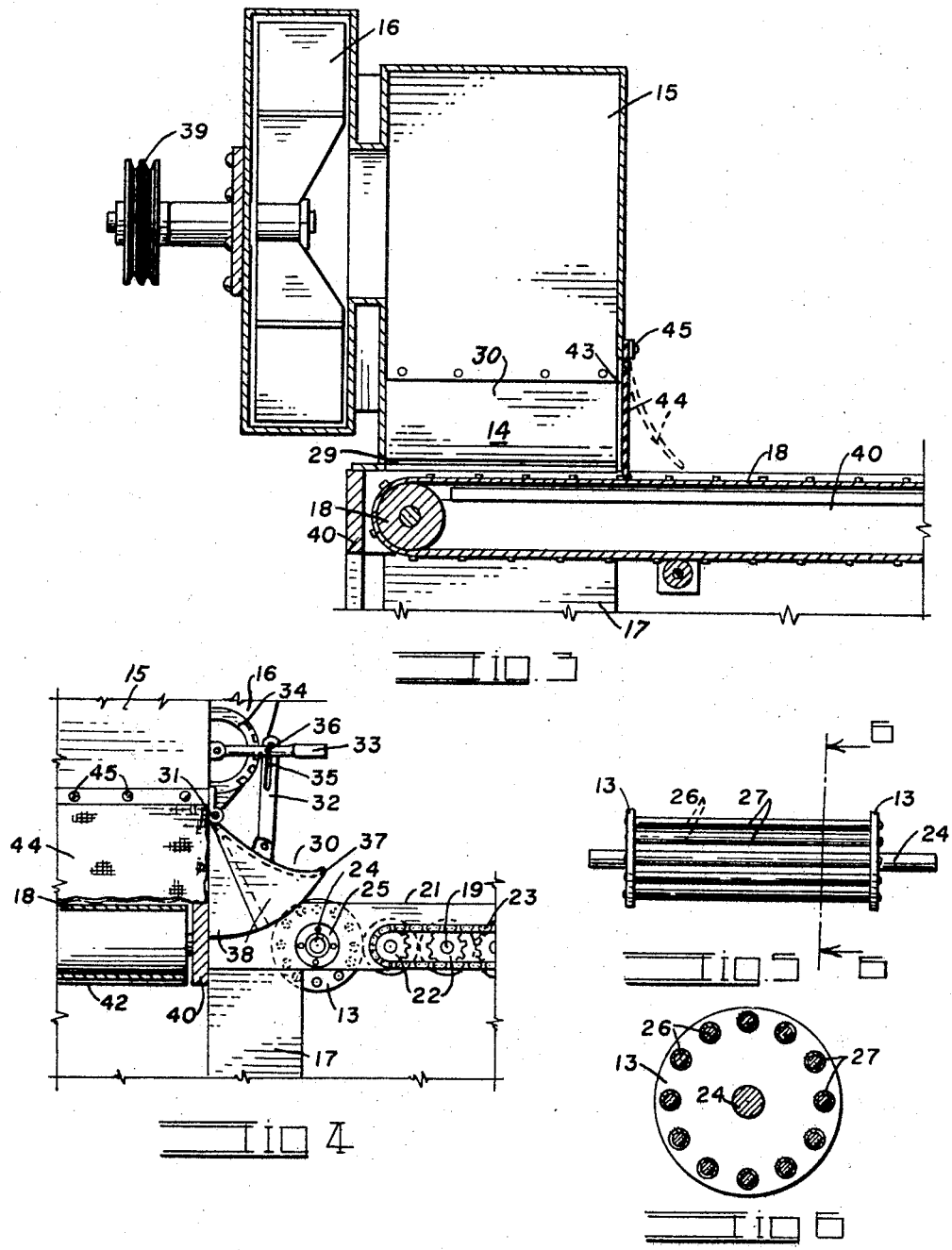

3,428,172
PNEUMATIC POTATO SEPARATOR
Carl C. Hoffman, Box 547, Monte Vista, Colo. 81144
Filed Aug. 22, 1966, Ser. No. 574,164
U.S. Cl. 209—3        6 Claims
Int. Cl. B03b 1/00

ABSTRACT OF THE DISCLOSURE

A pneumatic separator has a suction box with an air intake extending therefrom and in close proximity to the discharge end of a roller conveyor carrying potatoes and rocks. The potatoes are entrained and conveyed by the air stream in generally the same direction of travel as that of the roller conveyor.

---

This invention relates to means for separating potatoes from the rocks, tops, clods and other dross delivered by conventional potato digging equipment and has for its principal object the provision of a highly efficient device in which the separation will be effectively accomplished by means of controlled air curents so as to avoid damage to the potatoes and yet provide a clean, continuous and rapid separation thereof from the undesirable materials.

A further object is to provide a pneumatic potato harvester so constructed that incoming air will be directed and controlled to efficiently accomplish the purposes of the invention without waste so as to accomplish maximum results with a minimum of power consumption.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

FIG. 1 is a top, fragmentary, plan view of the separating portion of the improved pneumatic potato harvester;

FIG. 2 is a longitudinal section of the separating portion taken on the line 2—2, FIG. 1;

FIG. 3 is a cross section of the separating portion taken on the line 3—3, FIG. 1;

FIG. 4 is a fragmentary cross section taken on the line 4—4, FIG. 1;

FIG. 5 is a detail side elevational view of an open rod roller employed in the harvester which will be later described; and FIG. 6 is an enlarged cross section through the rod roller, taken on the line 6—6, FIG. 5.

Conventional potato harvesters are mounted upon suitable wheeled chassis, so that they may be driven or drawn along the rows of potatoes in a field, and are provided with conventional forwardly extending digger blades which lift the potato plants onto inclined chain conveyors which elevate and deliver a stream of the dug material to the harvester for separation of the potatoes from the accumulated extraneous material such as from the rocks, clods, leaves, stalks and roots. Since the above elements are conventional with substantially all potato harvesters they have been omitted from the drawing and this specification is devoted more specifically to the separation means of the harvester.

Briefly, in this invention the stream of dug materials from a conventional digger are delivered by the inclined digger-chain conveyors onto a plurality of closely spaced, parallel, power-driven, cushioned rollers 12 which in turn deliver the materials over a power-driven cylindrical cage, herein referred to as an open rod-roller 13, into an intake passage 14 of a relatively large rectangular, vacuum chamber 15 in which a rising current of air of less than atmospheric pressure is maintained by means of a suitably housed suction fan 16. The air current is so regulated that the heavier materials, such as rocks and clods, having a less pneumatic buoyancy than the potatoes will drop and discharge through a rock fall passage 17. The lighter materials, such as leaves, stalks and trash, having a greater pneumatic buoyancy than the potatoes, will follow the air flow and be discharged by the fan. The potatoes will drop to a belt conveyor 18 which closes an open bottom in the vacuum chamber and will be delivered by the belt conveyor to any desired destination such as to conventional graders and sackers.

The high efficiency of the separating means of this invention is dependent upon the design of, and the relative arrangement of, the individual elements recited in the above brief description as described more in detail herebelow.

The rollers 12 are cylinders of relatively thick resilient material, such as rubber, surrounding and affixed to roller shafts 19 which are journalled in suitable bearings 20 in an elongated incoming conveyor frame 21. Each roller shaft carries a drive sprocket 22 adjacent its one extremity which is engaged by a power-driven roller drive chain 23 so that all of the rollers rotate in a common direction to convey materials toward the intake passage 14. The rollers are positioned in relatively close spaced relation, but do not necessarily contact, so that particles of sand and soil may filter therebetween as the materials travel rearwardly. The rollers act to continuously roll and tumble the potatoes, rocks, clods and trash so as to loosen and break up any attached soil and deliver the materials in a cleaned condition to the open rod-roller 13. The resiliency of the rollers tends to prevent damage to the tumbling potatoes.

The open rod-roller 13 comprises two spaced-apart end discs concentrically mounted on a supporting shaft 24 which is mounted in suitable bearings 25 in the conveyor frame 21 and which is provided with a drive sprocket 46. A cylindrical cage of parallel spaced-apart rods 26 extend between the end discs. Each of the rods 26 is surrounded by an elongated cushion sleeve 27, as shown in FIG. 6, to reduce the possibility of damage to the potatoes. It will be noted that the rod-roller 13 is placed directly in the air stream entering the intake passage 14, as indicated by the arrows 28 in FIG. 2, so that the full blast of entering air flows transversally, upwardly and rearwardly through the rod roller in the same direction that the stream of potatoes and other material being carried rearwardly by the rod roller so that there is no interference by the rearwardly traveling materials. This subjects the feed material to an air blast of sufficient velocity to blow the more pneumatically buoyant materials such as the potatoes and the plant debris upwardly and rearwardly into the vacuum chamber 15 but not of sufficient velocity to elevate the rocks and clods. The latter remain on and are carried rearwardly by the rod-rollers 13 and are deposited into the rock fall passage 17 to be returned to the field or other receptacle.

The intake passage 14 is semiconfined to preserve the air velocity by means of a flexible bottom apron 29 and an adjustable upper hood 30. The apron 29 comprises a flexible flap of rubber-impregnated fabric or similar material fixedly secured along its rearward edge below the intake passage 14 and is arched forwardly over the rock fall passage 17 into close proximity with the rod-roller 13, as shown in FIG. 2, so that it will be flexibly depressed downwardly and forwardly by descending rocks. The adjustable arcuate upper hood 30, preferably of rubber impregnated fabric, is hinged at its forward edge, as shown at 31, to the vacuum chamber 15 and arches downwardly and forwardly over the rod-roller 13. The angle of the hood can be preset in any desired manner to accommodate the size of the inflow material from the particular field being worked upon. As illustrated, the hood when being carried rearwardly by the rod-roller 13. 33 which can be set in any desired position on a notched sector 34 as is customary with agricultural machinery. It will be noted that the link 32 is provided with an elongated slot 35 which fits over a pin 36 in the lever 33 so that the hood may be raised by moving the lever upwardly and so that the hood may rise independently of the lever 33 should excessively large entering materials impact the hood when being carried rearwardly by the rod-roller 13. It is preferred to have the forward edge of he hood turned arcuately upward, as shown at 37, to facilitate entry of the excessively large materials. The sides of the hood are closed by arcuate overlapping, telescoping end plates 38 which allow vertical adjustment of the hood yet resist entry of air.

The vacuum chamber 15 is preferably rectangular with a horizontal cross sectional area greatly in excess of the cross sectional area of the intake passage 14 so that the velocity of the air entering from the latter will be instantly and appreciably reduced so as to drop the potatoes to the open bottom of the vaccum chamber 15. The large rectangular shape of the chamber causes dust particles to accumulate and pack in the rectangular internal corners thereof and these packs of dust particles will, due to the vibration of the machine, eventually drop to the open bottom of the vaccum chamber and be carried away so as to reduce troublesome dust-packing in the fan 16.

The fan 16 may be of any suitable housed type which will deliver a relatively large amount of relatively low pressure air and it may be power driven in any conventional manner such as through the medium of V-belts trained over a multiple belt pulley 39 mounted on the shaft of the fan. The housing of the fan 16 may be supported in any suitable manner so that the intake thereof, indicated at 46, will open directly and solely to the vacuum chamber 15 as shown in FIG. 3.

The belt conveyor 18 is mounted in a horizontal belt conveyor frame 40 directly below the open bottom of the vacuum chamber so as to substantially close the latter. The belt conveyor may be driven in any desired manner such as through the medium of a chain sprocket 41 and may be of any suitable type positioned with its axis at 90° to the axis of the path of the incoming materials. It is preferably provided with suitable transversally extending cleats 42 to assist in conveying the potatoes thereon through a discharge opening 43 in the side of the vacuum chamber. The opening 43 is closed against incoming air by means of a flexible curtain 44 of rubberized fabric or similar material riveted along its upper edge to the vacuum chamber, as shown at 45, and brushing upon the belt conveyor 18 at its lower edge so that it may be swung outwardly by the potatoes riding on the belt conveyor.

While the invention has been described more particularly for use on potato harvesters it will be found equally useful on other crops which are susceptible to pneumatic separation.

Attention is called to the fact that the upper hood 30 is transversally arched downwardly throughout its length and the bottom apron is similarly arched upwardly to create a venturi-like cross section to the intake passage 14. Thus, the entering air will greatly increase in velocity as it passes through the restricted midportion of the passage to assist in raising potatoes through the passage and will instantly decrease in velocity at the discharge of the passage to allow the potatoes to drop to the conveyor 18.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. Apparatus for separating potatoes from a stream of intermixed potatoes and dross materials of greater density than potatoes, said materials including rocks, said apparatus comprising:
   structure including a potato receiving chamber and forming a restricted cross section intake communicating with the chamber interior, said intake opening relatively forwardly,
   conveyor means for supporting and traveling said stream along a path extending relatively rearwardly with a substantial horizontal component and into close proximity to said intake, there being a discharge zone beneath said intake, said intake including a lower flap projecting forwardly over said discharge zone and in close proximity to a lower portion of the conveyor means rearward terminal and an upper flexible hood projecting forwardly over an upper portion of the conveyor means rearward terminal,
   and means for effecting air flow at such high velocity in a rearward direction along said path proximate said conveyor means and rearwardly through said intake that potatoes are effectively transported bodily rearwardly in the air stream from the conveyor means proximate said intake to the chamber interior via said intake, whereas said dross materials of greater density than potatoes are received downwardly into said discharge zone in response to operation of said conveyor means.

2. Apparatus as defined in claim 1 wherein said intake has venturi shape rearwardly of said conveyor means.

3. Apparatus as defined in claim 1 wherein said lower flap is downwardly flexible to pass rocks dumped off the conveyor rearward terminal and into said zone.

4. Apparatus as defined in claim 3 including other means to adjust the vertical position of the hood relative to the conveyor means.

5. Apparatus as defined in claim 1 wherein said chamber includes upright side walls and a bottom wall defined by a moving belt for transporting potatoes from the chamber, said chamber having an air outlet, said air flow effecting means including a blower having its suction inlet in communication with said chamber outlet.

6. Apparatus as defined in claim 3 wherein said conveyor means includes a series of parallel rollers incorporating cushions engageable with said materials and potatoes, and an openwork rotary cage interposed between said rollers and intake, and means to rotate said rollers and cage about horizontal axes to convey said potatoes and materials toward said intake, said flap engaging and being deflected downwardly by the rotating cage.

References Cited

UNITED STATES PATENTS

| | | | |
|---|---|---|---|
| 2,294,086 | 8/1942 | Hinds | 209—139 X |
| 2,535,801 | 12/1950 | La Pointe | 209—139 X |
| 2,717,076 | 9/1955 | Leighton | 209—138 |
| 2,717,077 | 9/1955 | Leighton | 209—139 |
| 2,762,506 | 9/1956 | Fine | 209—139 X |
| 2,900,068 | 8/1959 | Curl | 198—127 X |
| 3,227,276 | 1/1966 | Leighton | 209—139 |
| 3,358,830 | 12/1967 | Duncan | 209—136 X |
| 2,257,552 | 9/1941 | Hammock | 209—147 X |
| 2,499,037 | 2/1950 | Roles | 209—147 X |

FRANK W. LUTTER, *Primary Examiner.*

U.S. Cl. X.R.

209—35, 136, 147, 154